(12) United States Patent
Abe et al.

(10) Patent No.: US 8,678,454 B2
(45) Date of Patent: Mar. 25, 2014

(54) FRONT VEHICLE BODY STRUCTURE

(71) Applicant: Honda Motor Co., Ltd, Tokyo (JP)

(72) Inventors: Ryota Abe, Wako (JP); Shun Ueno, Isesaki (JP)

(73) Assignee: Honda Motor Co., Ltd, Tokyo (JP)

( * ) Notice: Subject to any disclaimer, the term of this patent is extended or adjusted under 35 U.S.C. 154(b) by 0 days.

(21) Appl. No.: 13/862,771

(22) Filed: Apr. 15, 2013

(65) Prior Publication Data

US 2013/0313839 A1   Nov. 28, 2013

(30) Foreign Application Priority Data

May 25, 2012   (JP) ................................. 2012-119435

(51) Int. Cl.
*G09F 7/00* (2006.01)

(52) U.S. Cl.
USPC ........... 293/115; 293/117; 296/193.1; 40/200

(58) Field of Classification Search
USPC ........ 293/117, 102, 115; 296/187.09, 193.09, 296/193.1; 40/200, 211
See application file for complete search history.

(56) References Cited

U.S. PATENT DOCUMENTS

| | | | | |
|---|---|---|---|---|
| 4,917,426 A | * | 4/1990 | Copp | 293/142 |
| 6,167,645 B1 | * | 1/2001 | Gasko et al. | 40/200 |
| 7,752,785 B2 | * | 7/2010 | Beer et al. | 40/209 |
| 8,191,944 B2 | * | 6/2012 | Rinklin | 293/142 |

FOREIGN PATENT DOCUMENTS

| | | |
|---|---|---|
| JP | 6-79661 U | 11/1994 |
| JP | 2005-075126 A | 3/2005 |
| JP | 2008-087615 A | 4/2008 |

* cited by examiner

*Primary Examiner* — Joseph Pape
(74) *Attorney, Agent, or Firm* — Westerman, Hattori, Daniels & Adrian, LLP (57) ABSTRACT

A front vehicle body structure includes a bumper face that extends in a vehicle width direction and a license base that is formed separately from the bumper face and fixed to the bumper face. The license base includes a main body which allows a license plate to be attached to a front surface thereof, a leg portion that extends rearward from a rear surface of the main body, and a hinge portion that extends downward from a rear end of the leg portion and is capable of being bent upward. The license base is fixed to the bumper face by engaging the hinge portion that has been bent upward with the bumper face.

8 Claims, 10 Drawing Sheets

FRONT VEHICLE BODY STRUCTURE

CROSS REFERENCES TO RELATED APPLICATIONS

The present application claims priority under 35 U.S.C. §119 to Japanese Patent Application No. 2012-119435, filed May 25, 2012, entitled "Front Vehicle Body Structure." The contents of this application are incorporated herein by reference in their entirety.

TECHNICAL FIELD

The exemplary embodiment of the present disclosure relates to a front vehicle body structure applied to a vehicle, such as an automobile.

BACKGROUND

Japanese Unexamined Utility Model Registration Application Publication No. 6-79661 and Japanese Unexamined Patent Application Publication No. 2005-75126, for example, describe a method for fixing a license plate to a bumper face of a vehicle, such as an automobile. According to this method, a recess is formed in a front surface of the bumper face, and the license plate is fitted into the recess and fixed to the bumper face with bolts.

In some countries, it is not mandatory to have a license plate mounted on a vehicle. In such a country, if the license plate is removed from the vehicle according to, for example, Japanese Unexamined Utility Model Registration Application Publication No. 6-79661, the recess becomes exposed and stands out, which degrades the appearance of the vehicle body.

Accordingly, Japanese Unexamined Patent Application Publication No. 2008-87615, for example, describes a method for securing a license plate without forming a recess in a bumper face. In this method, a license base, which is a separate component, is attached to the bumper face with bolts, and the license plate is fixed to a front surface of the license base with bolts.

According to Japanese Unexamined Patent Application Publication No. 2000-07615, mounting seats for the bolts need to be provided on the bumper face. Therefore, when the license plate and the license base are removed in countries where it is not mandatory to have a license plate mounted on a vehicle, the mounting seats become exposed. As a result, the appearance of the vehicle body is degraded, although not as severely as the case in which the recess is exposed.

In addition, it may be difficult to attach the mounting seats depending on the design of the bumper face. In other words, the design of the bumper face is limited when the mounting seats need to be installed, and the degree of freedom in design of the bumper face is reduced.

SUMMARY

The exemplary embodiment of the present application describes a front vehicle body structure with which the appearance of a vehicle body can be improved and the freedom in design of a bumper face can be increased.

According to an embodiment of the present disclosure, a front vehicle body structure includes a bumper face that extends in a vehicle width direction and a license base that is formed separately from the bumper face and fixed to the bumper face. The license base includes a main body which allows a license plate to be attached to a front surface thereof, a leg portion that extends rearward from a rear surface of the main body, and a hinge portion that extends downward from a rear end of the leg portion and is capable of being bent upward. The license base is fixed to the bumper face by engaging the hinge portion that has been bent upward with the bumper face.

According to the embodiment, the license base is fixed to the bumper face by engaging the hinge portion that has been bent upward with the bumper face. Accordingly, it is not necessary to form a recess in the bumper face or attach mounting seats to the bumper face to fix the license base to the bumper face. Therefore, the appearance of the vehicle body in the state in which the license plate and the license base are removed can be improved. Moreover, it is not necessary to attach mounting seats to the bumper face to fix the license base to the bumper face. Therefore, the design of the bumper face is not limited by the mounting seats, and the degree of freedom in design of the bumper face can be increased.

In the embodiment of the present disclosure, preferably, the bumper face has a bumper opening that opens the bumper face in a front-rear direction of a vehicle body and a wall portion that extends rearward from a top edge of the bumper opening, and the hinge portion is L-shaped in vertical cross section and a rear end of the wall portion is clamped between the hinge portion and the leg portion in a state in which the hinge portion is bent upward.

With this structure, in the state in which the hinge portion that is L-shaped in vertical cross section is bent upward, the rear end of the wall portion of the bumper face is clamped between the hinge portion and the leg portion. Accordingly, it is not necessary to form a recess in the bumper face or attach mounting seats to the bumper face to fix the license base to the bumper face. Therefore, the appearance of the vehicle body in the state in which the license plate and the license base are removed can be improved.

In the embodiment of the present disclosure, preferably, the hinge portion includes a reduced thickness portion that is disposed near the leg portion and serves as a bending point and a latch portion that is disposed below the reduced thickness portion and extends rearward, and the led portion has a first opening at the rear end thereof, the first opening allowing the latch portion to be inserted therethrough and engaged therewith when the hinge portion is bent upward with the reduced thickness portion serving as the bending point. A length of the latch portion in the front-rear direction is preferably greater than a depth of the first opening in the front-rear direction.

With such a structure, since the hinge portion includes the reduced thickness portion that is disposed near the leg portion and serves as a bending point, a lower part of the hinge portion gradually moves (pivots) so as to approach the rear end of the leg portion when the hinge portion is bent upward. The hinge portion also includes the latch portion that is disposed below the reduced thickness portion, and the first opening that allows the latch portion to be inserted therethrough and engaged therewith is formed at the rear end of the leg portion. Therefore, when the hinge portion reaches a predetermined position, the latch portion is inserted through and engaged with the first opening, so that relative movement of the hinge portion is regulated. In other words, the hinge portion is prevented from being moved away from the rear end of the leg portion by the restoring force (elastic deformation) of the reduced thickness portion.

According to the embodiment of the present disclosure, since the length of the latch portion in the front-rear direction of the vehicle body is greater than the depth of the first opening in the front-rear direction, the hinge portion is held (temporarily secured) at a position behind the leg portion which is separated from the leg portion by a predetermined distance. Accordingly, the leg portion and the hinge portion can be easily and smoothly placed above and below the rear end of the wall portion. Thus, the work efficiency in engaging the hinge portion with the bumper face can be increased.

In the embodiment of the present disclosure, preferably, the leg portion further has a second opening at the rear end thereof, and the hinge portion further includes a fastening portion that is disposed at a position corresponding to a position of the second opening in the state in which the hinge portion is bent upward. When a fastening member is fastened to the second opening and the fastening portion from the front in the state in which the hinge portion is bent upward, the hinge portion preferably approaches the leg portion so that the rear end of the wall portion is clamped between the leg portion and the hinge portion.

As described above, when the hinge portion is bent upward, the hinge portion is held at a position behind the leg portion which is separated from the leg portion by a predetermined distance. When the leg portion and the hinge portion in this state are placed above and below the rear end of the wall portion and then the fastening member is fastened to the second opening and the fastening portion from the front, the latch portion is further inserted through the first opening and the hinge portion further approaches the leg portion. Finally, the rear end of the wall portion is clamped between the leg portion and the hinge portion, and the license base is fixed to the bumper face. Accordingly, not only the work efficiency in engaging the hinge portion with the bumper face but also the accuracy of installation of the license base onto the bumper face can be increased.

Since the rear end of the wall portion can be clamped between the leg portion and the hinge portion by the fastening force applied by the fastening member, the license base can be securely fixed to the bumper face at the rear end of the wall portion. Accordingly, less fastening force with which the license base is fixed to the bumper face at other locations can be used. Therefore, at those other locations, the license base can be fixed to the bumper face with a simpler structure.

In the embodiment of the present disclosure, preferably, the rear surface of the leg portion is inclined forward, and the hinge portion extends along an imaginary extension line, that extends from the rear surface of the leg portion when the hinge portion is not bent.

With such a structure, since the rear surface of the leg portion is inclined forward and the hinge portion extends along the imaginary extension line that extends from the rear surface of the leg portion, the leg portion and the hinge portion can be formed by integral molding. In addition, since the rear surface of the leg portion is inclined forward, the fastening member can be fastened to the second opening with a tool that is inserted from the lower front. Accordingly, the work efficiency can be increased compared to the case in which the tool is inserted from the bottom.

The exemplary embodiment of the present disclosure provides a front vehicle body structure with which the appearance of a vehicle body can be improved and the degree of freedom in design of a bumper face can be increased.

BRIEF DESCRIPTION OF THE DRAWINGS

The advantages of the disclosure will become apparent in the following description taken in conjunction with the following drawings.

DETAILED DESCRIPTION

An embodiment of the present disclosure will now be described in detail with reference to the drawings. In the following description, the same components are denoted by the same reference numerals, and redundant descriptions thereof are omitted. In the drawings, "front-rear", "top-bottom", and "left-right" directions shown by the arrows respectively represent the front-rear direction of the vehicle body, the top-bottom direction of the vehicle body, and the left-right direction (vehicle width direction) as seen from a driver's seat.

Figure 1:
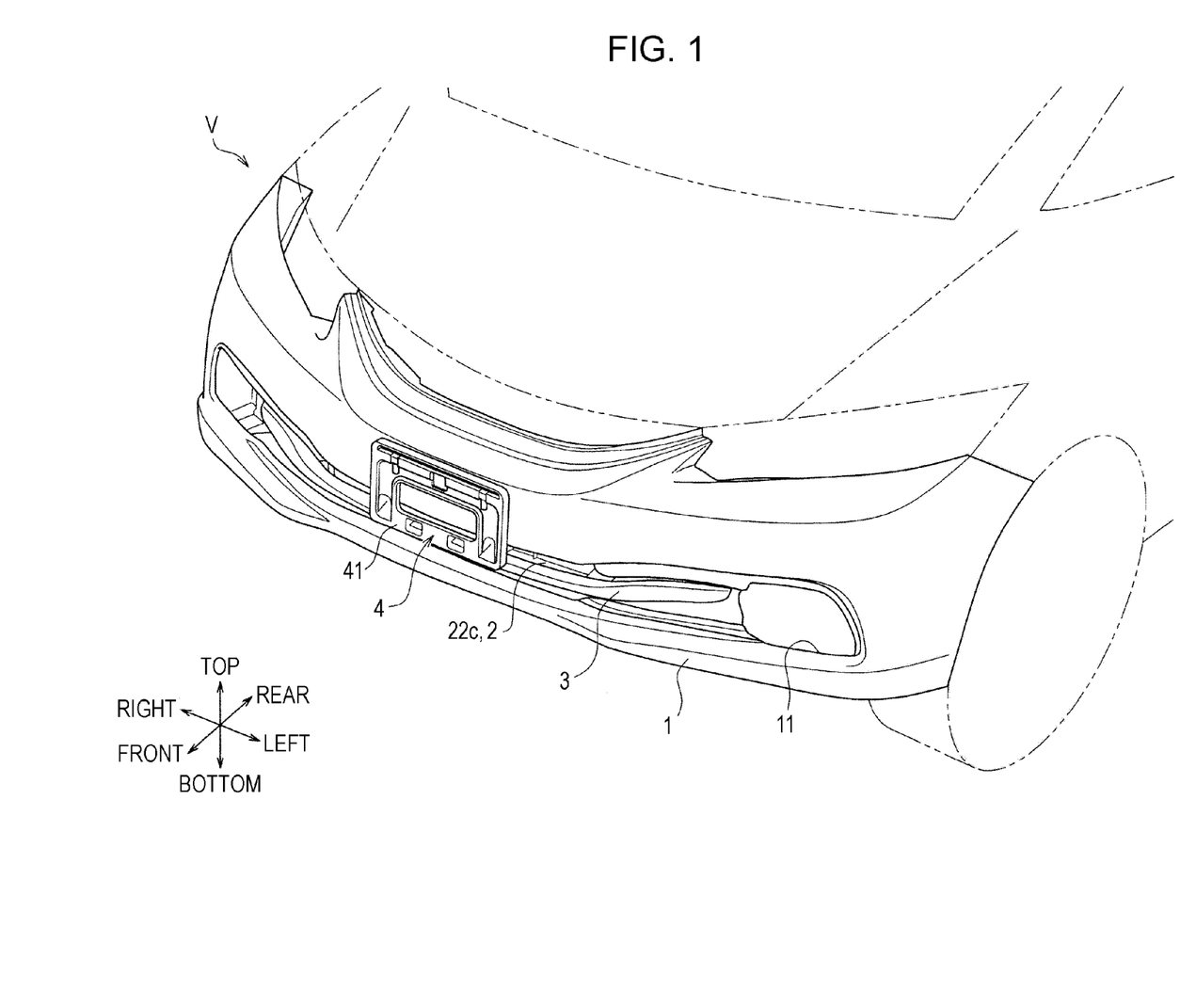
FIG. 1 is a perspective view of a front vehicle body having a front vehicle body structure according to an embodiment of the present disclosure.
Figure 2:
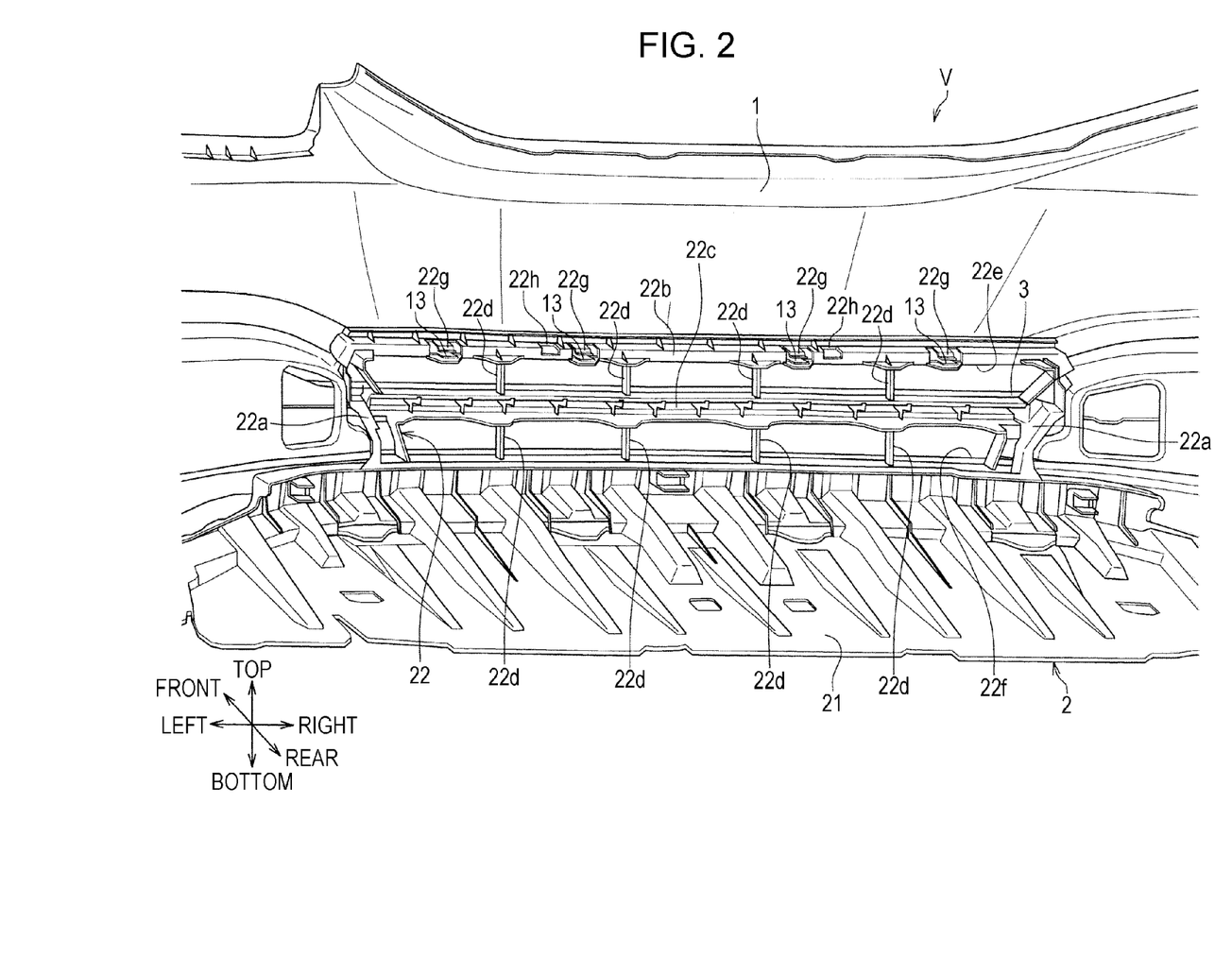
FIG. 2 is a rear perspective view of a bumper face and a lower grille in a state in which no license plate is attached.

Referring to FIGS. 1 and 2, a vehicle V having a front vehicle body structure according to the embodiment includes a bumper face 1, a lower grille 2 (see FIG. 2), a lower garnish 3, and a license base 4.

Bumper Face

Referring to FIG. 1, the bumper face 1 is a resin member that extends in a vehicle width direction and forms a design surface of the front vehicle body. The bumper face 1 is curved so that left and right end portions thereof are located back compared to a central portion thereof. A bumper opening 11 having a substantially rectangular shape is formed in a lower end section of the bumper face 1 so as to extend through the bumper face 1 in the front-rear direction.

Figure 4:
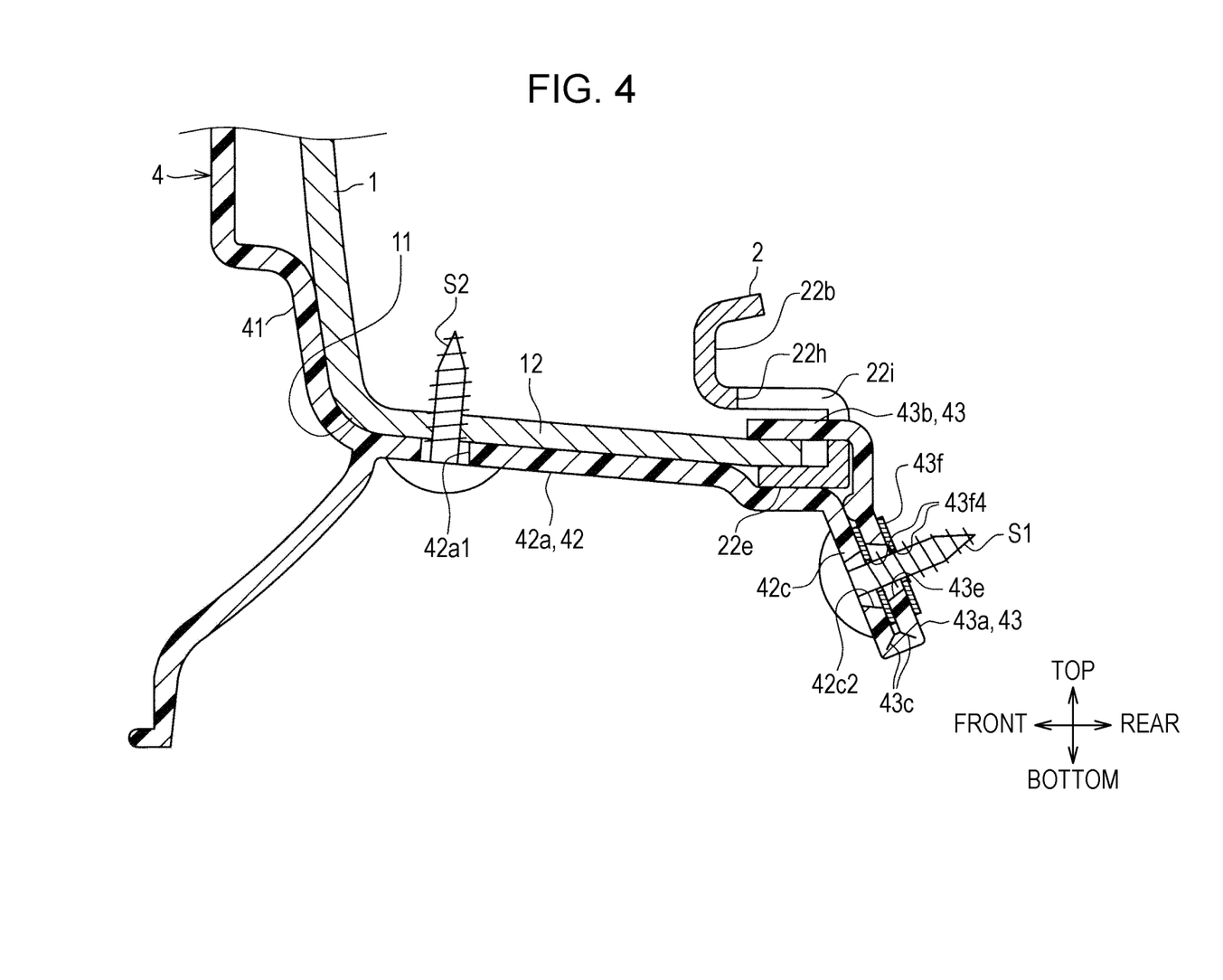
FIG. 4 is a sectional view of FIG. 3 taken along line IV-IV.

The bumper opening 11 functions as an air intake through which air is introduced to a radiator unit (not shown). As illustrated in FIG. 4, an upper wall portion 12, which serves as a wall portion, extends rearward from the upper edge of the bumper opening 11. As illustrated in FIG. 2, a plurality of positioning ribs 13 are provided at appropriate positions at the rear end of the upper wall portion 12.

Lower Grille

Referring to FIG. 2, the lower grille 2 is a resin member that is attached to the bumper face 1 from the rear. The lower grille 2 includes a base portion 21 and a grid-shaped passage portion 22. The base portion 21 is fixed to a lower part of the rear surface of the bumper face 1 at the front end thereof, and extends rearward beyond other portions by a predetermined distance. The passage portion 22 extends upward from the front end of the base portion 21 and allows air to pass therethrough.

The passage portion 22 includes a pair of side frame portions 22a that are spaced apart from each other in the left-right direction and extend in the top-bottom direction; an upper frame portion 22b that connects the upper ends of the side frame portions 22a; a fin portion 22c that is disposed at an intermediate position between the upper frame portion 22b and the base portion 21 in the top-bottom direction and extends between the side frame portions 22a; and a plurality of supports 22d that are disposed between the fin portion 22c and the base portion 21 and between the fin portion 22c and the upper frame portion 22b and that are spaced apart from each other in the vehicle width direction.

The passage portion 22 has an upper opening 22e that is positioned above the fin portion 22c and a lower opening 22f that is positioned below the fin portion 22c. Each of the upper opening 22e and the lower opening 22f is divided into multiple (five) sections by the multiple (four) supports 22d. The upper opening 22e and the lower opening 22f are located at positions corresponding to the position of the bumper opening 11 in the front-rear direction.

Engagement cut portions 22g to which the positioning ribs 13 of the bumper face 1 are engaged and positioning cut portions 22h used to position hinge portions 43, which will be described below, are formed in the upper frame portion 22b at appropriate positions.

Figure 5:
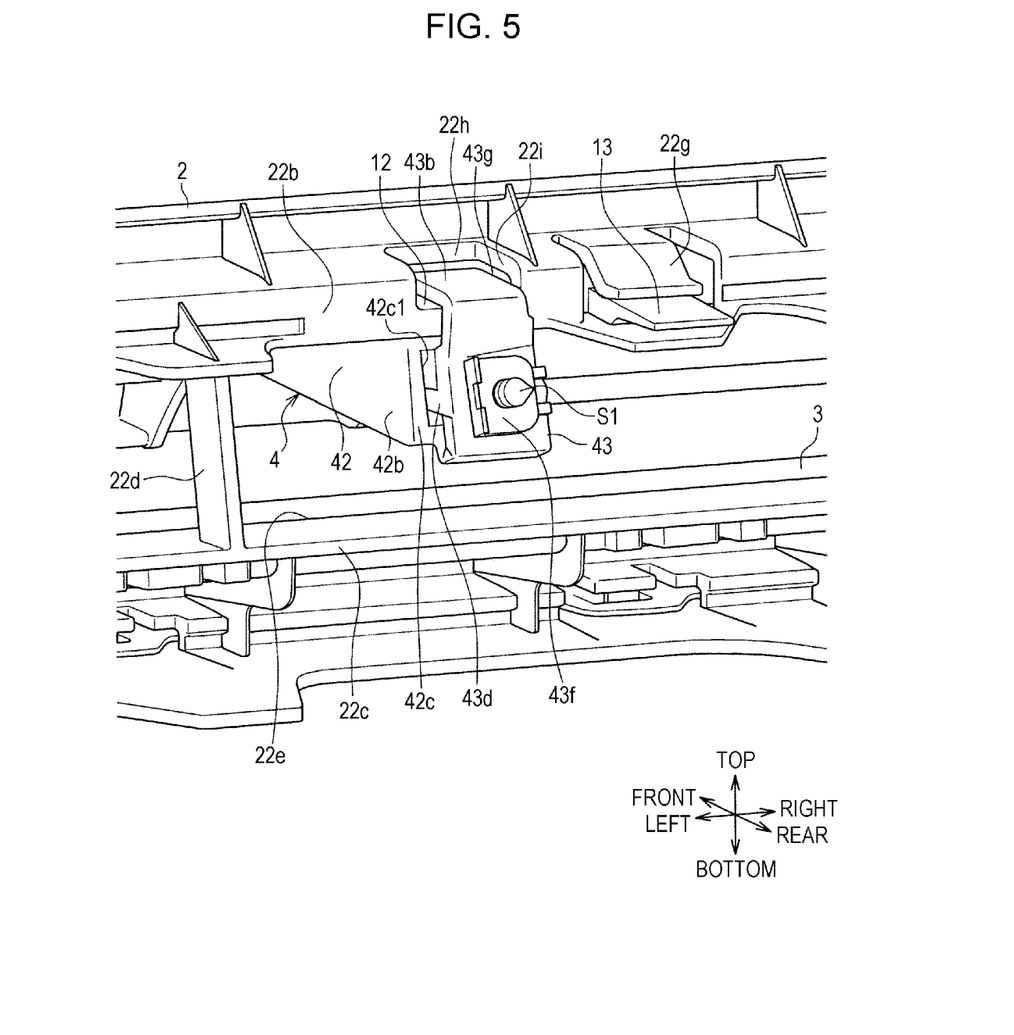
FIG. 5 is a rear perspective view illustrating the state in which a license plate is secured.

In the present embodiment, as illustrated in FIG. 5, the license base 4 is attached to the bumper face 1 while each hinge portion 43 is positioned by bringing a side surface 43g of the hinge portion 43 on the inner side thereof in the vehicle width direction into contact with a side surface 22i of the corresponding positioning cut portion 22h on the inner side thereof in the vehicle, width direction. Accordingly, the installation accuracy of the license base 4 can be increased.

Lower Garnish

Referring to FIG. 1, the lower garnish 3 is a resin member that functions as a decorative member for improving the design of the front vehicle body. The lower garnish 3 extends in the vehicle width direction and is fixed to the front surface of the fin portion 22c.

License Base

Figure 6A:
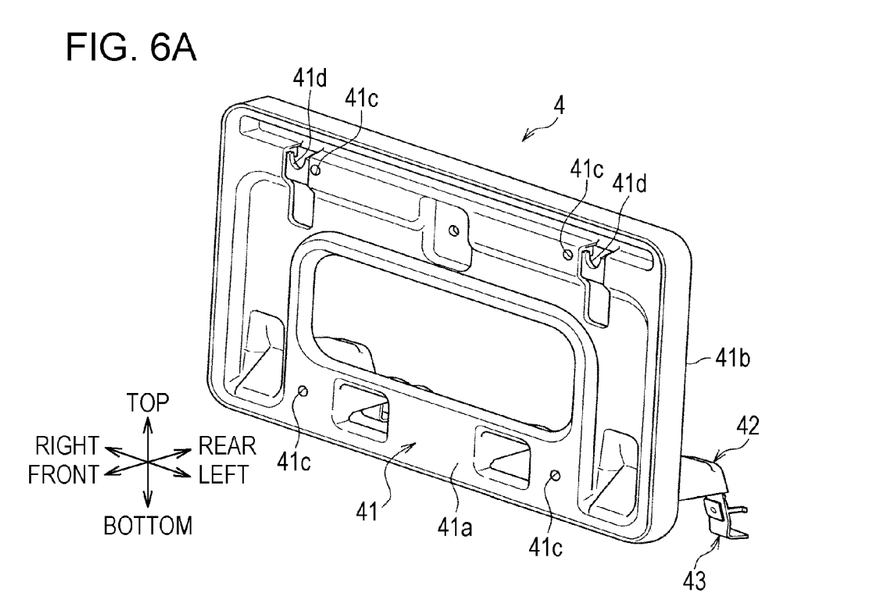
FIG. 6A is a front left perspective view of the license base.
Figure 6B:
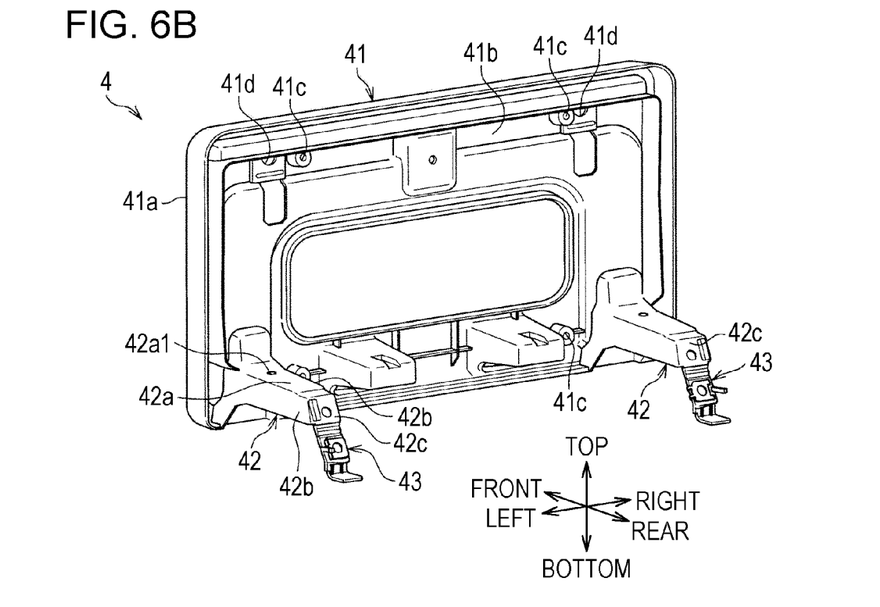
FIG. 6B is a rear left perspective view of the license base.

The license base 4 is a resin member used to fix a license plate (not shown) to the front surface of the bumper face 1, and is formed separately from the bumper face 1. As illustrated in FIGS. 6A and 6B, the license base 4 includes a main body 41, a pair of leg portions 42, and a pair of hinge portions 43, and is formed integrally by, for example, injection molding.

Main Body

As illustrated in FIG. 6A, the main body 41 is a rectangular plate-shaped part having a front surface 41a to which a license plate is attached. Four screw holes 41c are formed in the main body 41 at positions spaced apart from each other in the top-bottom and left-right directions. In this case, the license plate is fixed to the license base 4 by inserting screws through screw holes formed in the license plate and into the screw holes 41c in the license base 4. Attachment portions 41d, which are cut portions, for receiving tapping screws (not shown) are formed in an upper end part of the main body 41 at positions separated from each other in the left-right direction.

Leg Portion

As illustrated in FIG. 6B, the pair of leg portions 42 are spaced apart from each other in the left-right direction and extend rearward from a rear surface 41b of the main body 41. Each leg portion 42 has an inverted angular-U shape in vertical cross section, and includes an upper wall portion 42a, a pair of side wall portions 42b that extend downward from both ends of the upper wall portion 42a in the width direction, and a rear wall portion 42c that extends downward from the rear end of the upper wall portion 42a.

The upper wall portion 42a and the side wall portions 42b extend continuously from the rear surface 41b of the main body 41. A screw insertion hole 42a1 having a circular shape through which a tapping screw S2 is inserted is formed in a front end part of the upper wall portion 42a so as to extend through the upper wall portion 42a in the top-bottom direction. The side wall portions 42b are formed such that the distance therebetween increases from the upper portion toward the bottom portion (see FIG. 9B).

Figure 7:
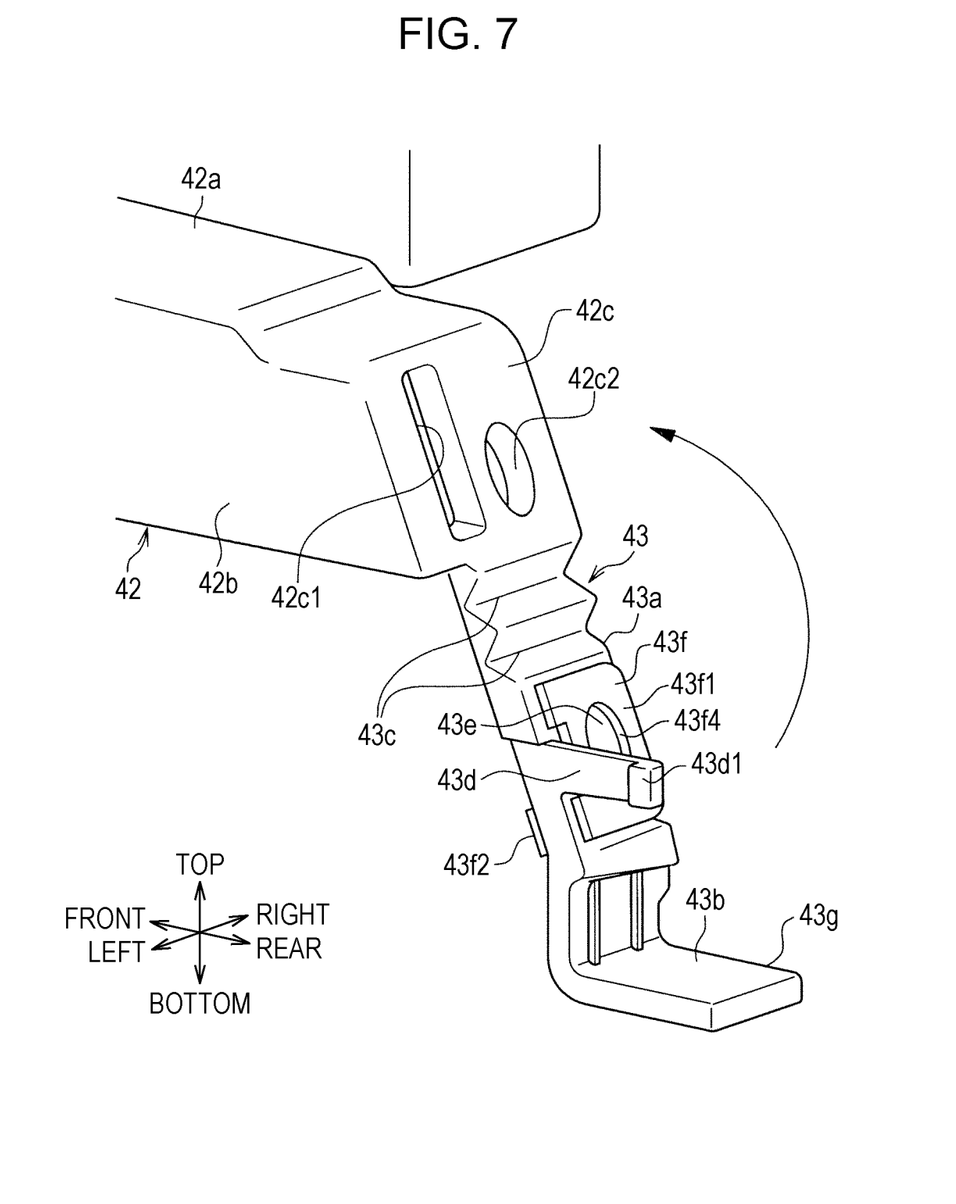
FIG. 7 is an enlarged perspective view of a part of FIG. 6B.

As illustrated in FIG. 7, the rear wall portion 42c is a wall-shaped portion that defines the rear end of the leg portions 42. The rear wall portion 42c is inclined upward and forward. An opening 42c1 and a screw insertion hole 42c2 are formed in the rear well portion 42c so as to extend through the rear wall portion 42c in the front-rear direction. The opening 42c1 and the screw insertion hole 42c2 are arranged next to each other in the left-right direction.

The opening 42c1, which serves as a first opening, is a vertically long rectangular opening which receives and engages with a latch portion 43d, which will be described below, of the corresponding hinge portion 43. The screw insertion hole 42c2, which serves as a second opening, is a circular through hole which receives a tapping screw S1 (see FIG. 8B).

Hinge Portion

Figure 8A:
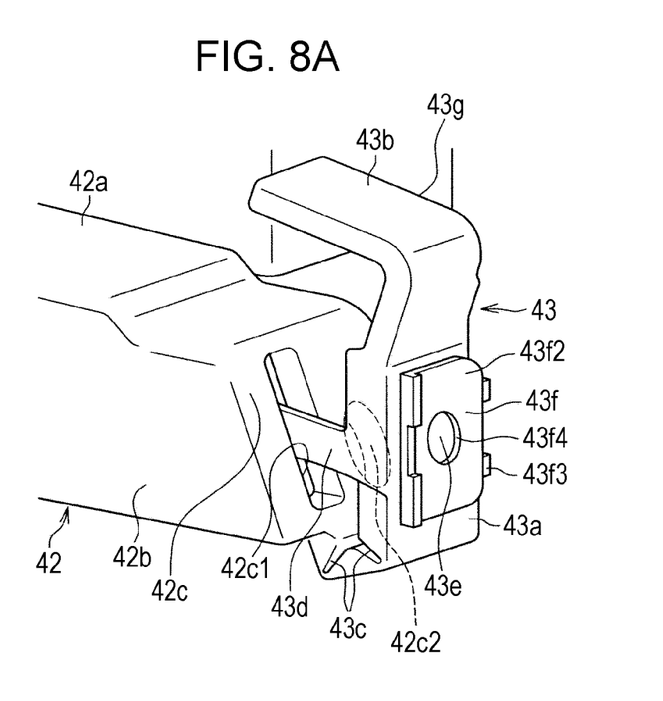
FIG. 8A is a perspective view illustrating the state in which the license base is temporarily secured.
Figure 8B:
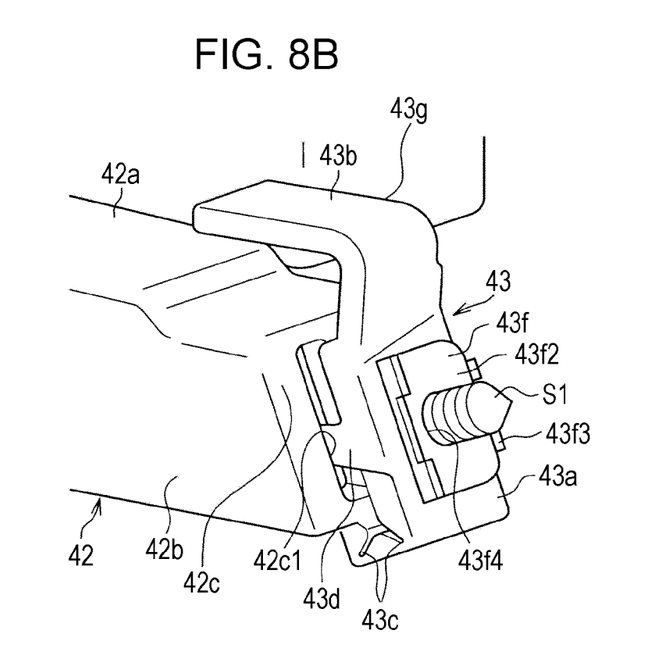
FIG. 8B is a perspective view illustrating the state in which the license base is finally secured.

As illustrated in FIG. 6B, each of the pair of hinge portions 43 extends downward from the lower end of the rear wall portion 42c of the corresponding leg portion 42. Referring to FIGS. 7, 8A, and 8B, each hinge portion 43 can be bent rearward and upward. As illustrated in FIG. 7, each hinge portion 43 is L-shaped in vertical cross section, and includes a base portion 43a that extends obliquely downward from the lower end of the rear wall portion 42c and an L-shaped end portion 43b that extends downward from the lower end of the base portion 43a and then rearward.

Figure 9A:
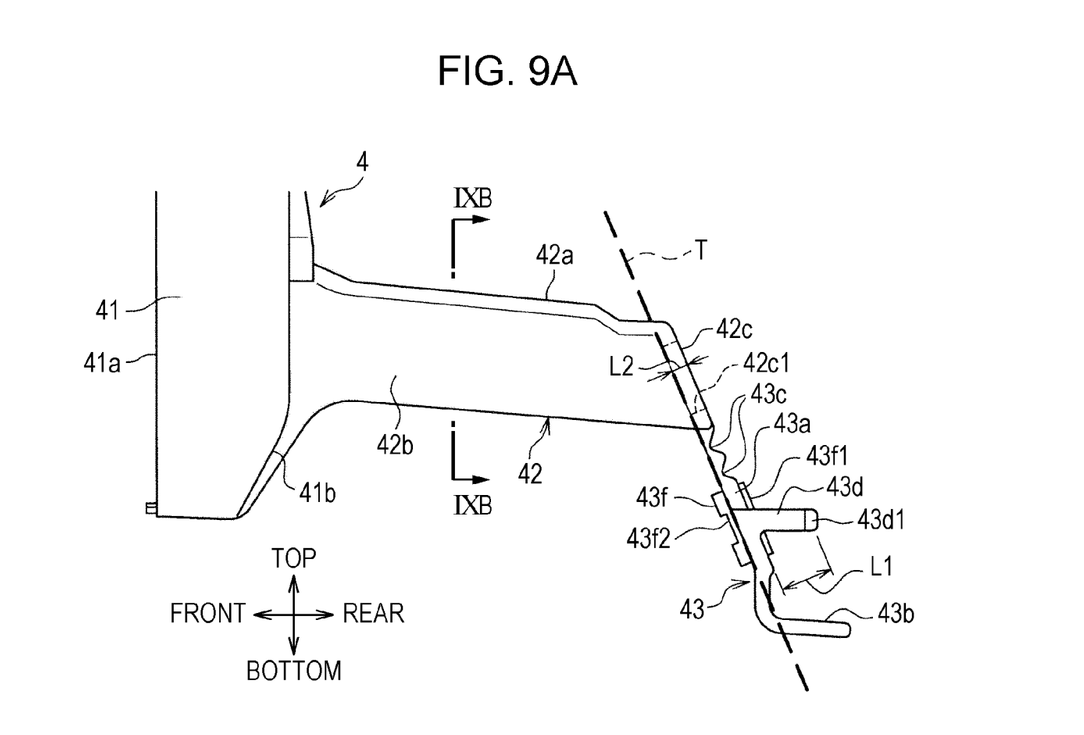
FIG. 9A is an enlarged side view of a part of the license base.
Figure 9B:
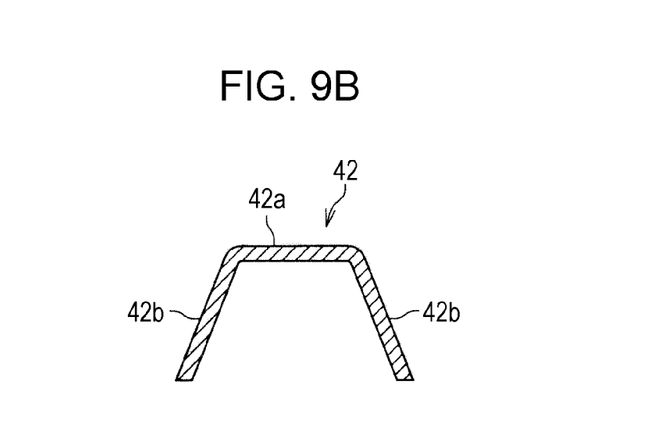
FIG. 9B is a sectional view of FIG. 9A taken along line IXB-IXB.

As illustrated in FIG. 9A, the base portion 43a is inclined upward and forward, and extends along an imaginary extension line T of the rear wall portion 42c. In other words, the base portion 43a and the rear wall portion 42c are inclined at the same angle with respect to the vertical plane. Referring to FIG. 7, the base portion 43a includes reduced thickness portions 43c, a latch portion 43d, a screw insertion hole 43e, and a J-nut 43f.

The reduced thickness portions 43c are formed so as to have a thickness smaller than that of other portions by a predetermined amount, and serve as bending points of the hinge portion 43. The reduced thickness portions 43c are located near the upper end (end adjacent to the leg portion 42) of the base portion 43a. The reduced thickness portions 43c are formed by cutting V-shaped grooves in the rear surface of the base portion 43a, and two reduced thickness portions 43c are formed next to each other in the top-bottom direction. The shape of the reduced thickness portions 43c may be changed as appropriate.

Referring to FIGS. 8A and 8B, the latch portion 43d is inserted into and engaged with the opening 42c1 in the leg portion 42 when the hinge portion 43 is bent upward. As illustrated in FIG. 7, the latch portion 43d is located below the reduced thickness portions 43c and extends rearward from an outer part of the rear surface of the base portion 43a. The latch portion 43d has an engagement portion 43d1 at an end thereof, the engagement portion 43d1 having a thickness greater than that of other portions by a predetermined amount. The engagement portion 43d1 engages with an edge of the opening 42c1 at the back end thereof. In the present embodiment, as illustrated in FIG. 9A, a length L1 of the latch portion 43d in the front-rear direction is greater than a length (depth) L2 of the opening 42c1 in the front-rear direction.

When the hinge portion 43 is bent rearward and upward with the reduced thickness portions 43c serving as the bending points, as illustrated in FIGS. 7 and 8A, a lower part of the hinge portion 43 gradually pivots or swings so as to approach the rear wall portion 42c of the leg portion 42. When the hinge portion 43 reaches a predetermined position, the latch portion 43d is inserted through the opening 42c1 and the engagement portion 43d1 engages with the edge of the opening 42c1 at the back end thereof, so that relative movement of the hinge portion 43 is regulated. Since the length L1 of the latch portion 43d in the front-rear direction is greater than the length L2 of the opening 42c1 in the front-rear direction, the hinge portion 43 is held (temporarily secured) at a position behind the leg portion 42 which is separated from the leg portion 42 by a predetermined distance.

Referring to FIGS. 7, 8A, and 8B, the screw insertion hole 43e is a circular through hole which receives the tapping screw S1. The screw insertion hole 43e is located below the reduced thickness portions 43c and on the inner side of the latch portion 43d. As illustrated in FIG. 8A, the screw insertion hole 43e is located at a position corresponding to the position of the screw insertion hole 42c2 in the leg portion 42 in the front-rear direction in the state in which the hinge portion 43 is bent upward.

Referring to FIGS. 7, 8A, and 8B, the J-nut 43f, which serves as a fastening portion, is a member into which the tapping screw S1 is screwed, and is fitted to the base portion 43a from the inner side thereof in the vehicle width direction. The J-nut 43f includes a rear surface portion 43f1 that extends along the rear surface of the base portion 43a, a front surface portion 43f2 that extends along the front surface of the base portion 43a, and a connecting portion 43f3 that connects the inner ends of the rear surface portion 43f1 and the front surface portion 43f2 in the vehicle width direction. At an outer end thereof in the vehicle width direction, the J-nut 43f has an opening that serves as an insertion opening. Screw insertion holes 43f4 having a circular shape are formed in the rear surface portion 43f1 and the front surface portion 43f2 so as to extend therethrough. The screw insertion holes 43f4 communicate with the screw insertion hole 43e, and are located at a position corresponding to the position of the screw insertion hole 42c2 of the leg portion 42 in the front-rear direction in the state in which the hinge portion 43 is bent upward.

Referring to FIGS. 8A and 8B, first, the hinge portion 43 is held at a position behind the leg portion 42 which is separated from the leg portion 42 by predetermined distance. Subsequently, the tapping screw S1 is inserted through the screw insertion holes 42c7, 43e, and 43f4 from the lower front, and is tightened. Accordingly, the latch portion 43d is further inserted through the opening 42c1, and the hinge portion 43 further approaches the leg portion 42. Finally, the base portion 43a approaches and becomes parallel to the rear wall portion 42c, and the end portion 43b approaches and becomes parallel to the upper wall portion 42a.

As illustrated in FIG. 7, the end portion 43b extends vertically downward from the lower end of the base portion 43a, and then extends horizontally rearward. As described below, when the hinge portion 43 is bent upward, the end portion 43b engages with the top surface of a rear end part of the upper wall portion 12 of the bumper face such that the upper wall portion 12 is clamped between the end portion 43b and the upper wall portion 42a of the leg portion 42 in the top-bottom direction.

The state in which the bumper face 1, the lower grille 2, and the license base 4 are secured will now be described with reference to FIGS. 3 to 5.

As illustrated in FIGS. 4 and 5, the end portion 43b of the license base 4 is inserted into the positioning cut portion 22h of the lower grille 2 and is engaged with the top surface of the rear end part of the upper wall portion 12 of the bumper face 1 that is exposed at the positioning cut portion 22h.

Referring to FIG. 4, the license base 4 is fixed to the bumper face 1 and the lower grille 2 by inserting the tapping screw S1 through the screw insertion holes 42c2, 43e, and 43f4 in the license base 4 from the lower front and tightening the tapping screw S1 such that the upper wall portion 12 of the bumper face 1 and the upper frame portion 22b of the lower grille 2 are clamped between the end portion 43b of the hinge portion 43 and the upper wall portion 42a of the leg portion 42 in the top-bottom direction.

In addition, as illustrated in FIG. 4, the license base 4 is fixed to the bumper face 1 by inserting the tapping screw 32 through the screw insertion hole 42a1 in the upper wall portion 42a of the license base 4 and the upper wall portion 12 of the bumper face 1 from below.

Figure 3:
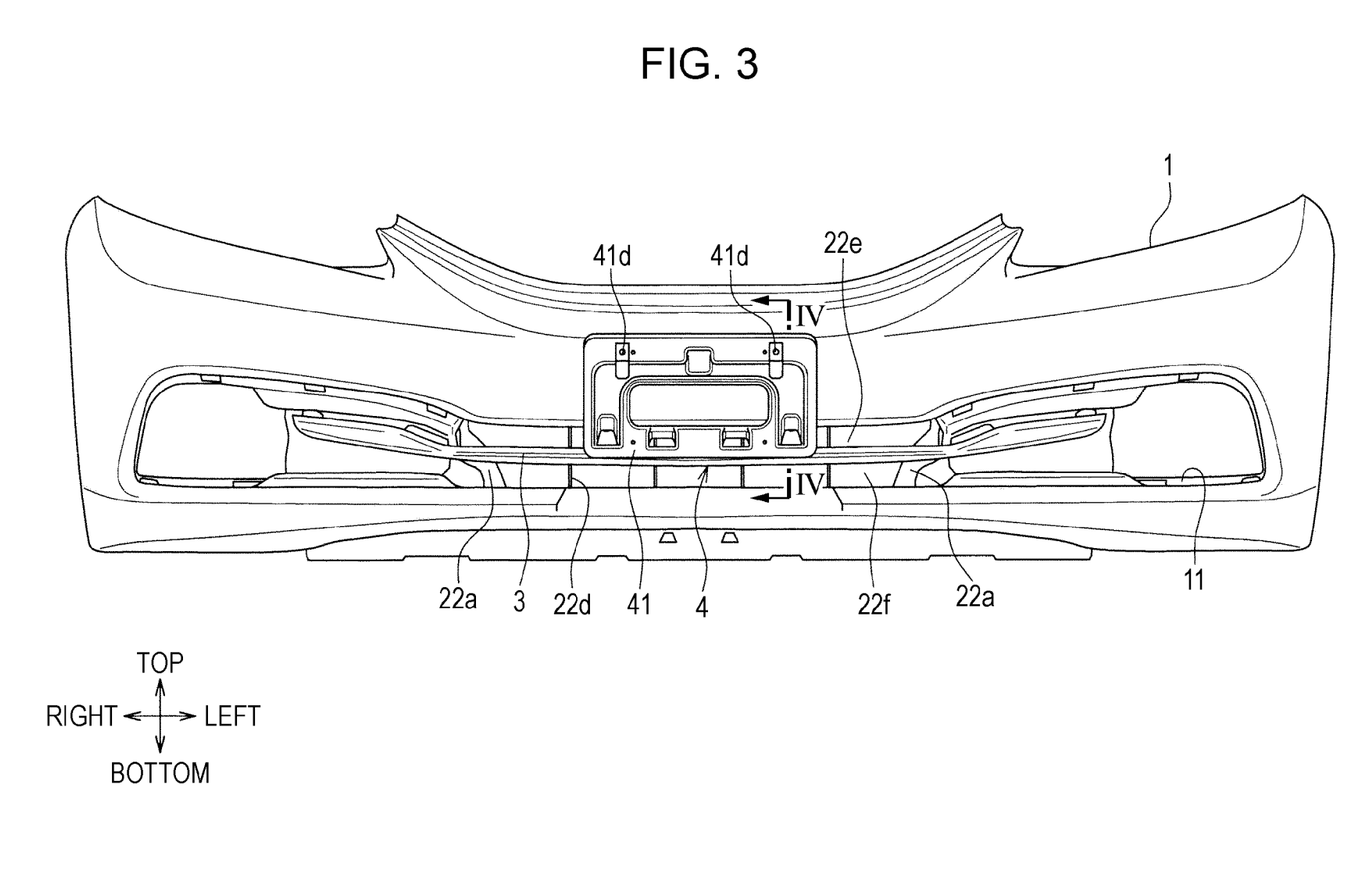
FIG. 3 is a front view of the front vehicle body.

In addition, as illustrated in FIG. 3, an upper end part of the license base 4 is fixed to the bumper face 1 by inserting tapping screws (not shown) through the attachment portions 41d of the license base 4 and the front face of the bumper face 1 from the front.

Since the hinge portion 43 is engaged with the top surface of the rear end part of the upper wall portion 12, the weight of the license base 4 placed on the fastening portion of the tapping screw 32 is relatively low. Therefore, the tapping screw 32 may be omitted.

The weight of the license base 4 is applied with a point around the top surface of the rear end part of the upper wall portion 12 serving as a fulcrum. However, in the present embodiment, the hinge portion 43 is engaged with the top surface of the rear end part of the upper wall portion 12, and a force for fixing (supporting) the license base 4 is ensured. Therefore, a fastening force to be applied to the attachment portions 41d can be reduced. In other words, it is not necessary to fasten the attachment portions 41d with a large force. Therefore, the tapping screws can be used. When the tapping screws are used, it is not necessary to form attachment holes in the front surface of the bumper face 1. Therefore, the appearance of the vehicle body is not degraded when the license plate and the license base 4 are not attached.

In the present embodiment, as illustrated in FIG. 4, the leg portion 42 and a mounting seat (J-nut 43f, for example) of the hinge portion 43 are hidden behind the main body 41 in the state in which the hinge portion 43 is bent upward. Accordingly, the appearance of the vehicle body in the state in which the license plate and the license base 4 are attached can be improved.

The vehicle V having the front vehicle body structure according to the present embodiment is basically structured as described above. A method for attaching the license base 4 will now be described.

First, as illustrated in FIGS. 7 and 8A, the hinge portion 43 is bent rearward and upward with the reduced thickness portions 43c serving as the bending points so that the latch portion 43d is inserted through the opening 42c1 and the engagement portion 43d1 is engaged with the edge of the opening 42c1 at the back end thereof. Thus, relative movement of the hinge portion 43 is regulated. Since the length L1 of the latch portion 43d in the front-rear direction is greater than the length L2 of the opening 42c1 in the front-rear direction, the hinge portion 43 is held at a position behind the leg portion 42 which is separated from the leg portion 42 by a predetermined distance. As a result, the license base 4 is temporarily secured.

Next, the hinge portion 43 and the leg portion 42 in the temporarily secured state are inserted into the bumper opening 11 and the upper opening 22e from the front (see FIG. 3).

Then, the end portion 43b of the hinge portion 43 and the upper wall portion 42a of the leg portion 42 are respectively positioned above and below the upper wall portion 12 of the bumper face 1 and the upper frame portion 22h of the lower grille 2 (see FIG. 4). Here, the hinge portion 43 is positioned by bringing the side surface 43g of the end portion 43b on the inner side thereof in the vehicle width direction into contact with the side surface 22i of the positioning cut portion 22h on the inner side thereof in the vehicle width direction see FIG. 5).

Subsequently, the tapping screw S1 is inserted through the screw insertion holes 42c2, 43e, and 43f4 from the lower front, and is tightened (see FIG. 4). When the tapping screw S1 is tightened, the latch portion 43d is further inserted through the opening 42c1, and the hinge portion 43 further approaches the leg portion 42 (see FIG. 8B).

Finally, the upper wall portion 12 of the bumper face 1 and the upper frame portion 22b of the lower grille 2 are clamped between the end portion 43b of the hinge portion 43 and the upper wall portion 42a of the leg portion 42 in the top-bottom direction (see FIG. 4).

Then, the tapping screw 32 is inserted through the screw insertion hole 42a1 in the upper wall portion 42a of the license base 4 and the upper wall portion 12 of the bumper face 1 from below (see FIG. 4). In addition, the tapping screws (not shown) are inserted through the attachment portions 41d of the license base 4 and the front face of the bumper face 1 from the front (see FIG. 3). As a result, the license base 4 is attached to the bumper face 1.

Figure 10A:
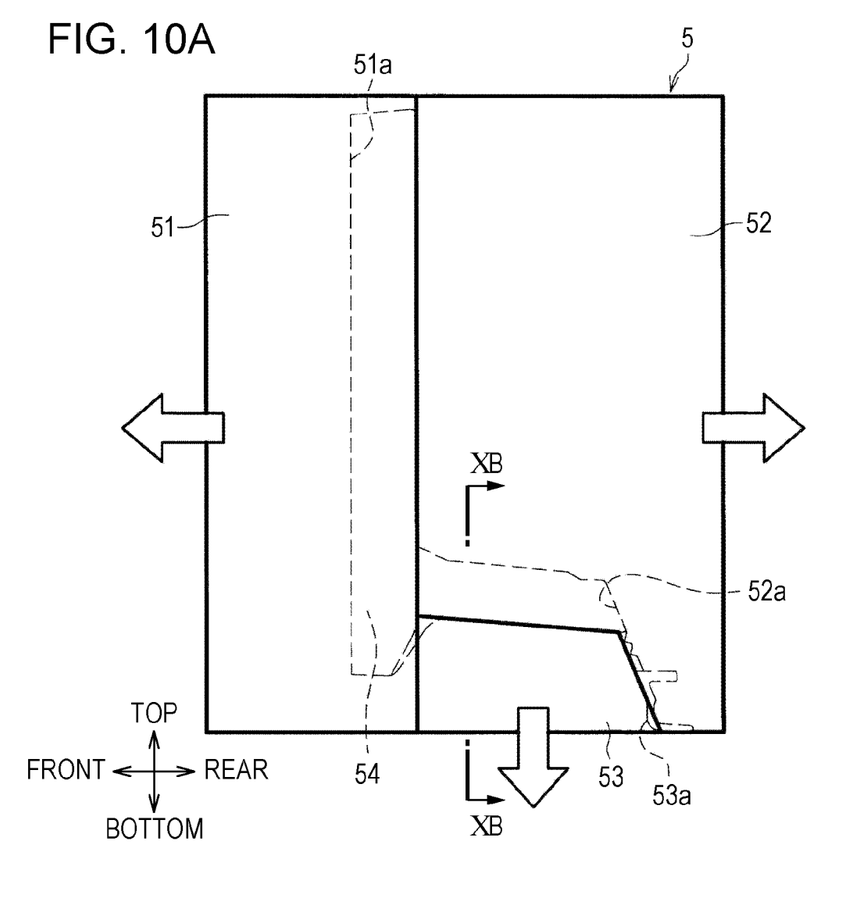
FIG. 10A is a schematic diagram illustrating a mold used to manufacture the license base.
Figure 10B:
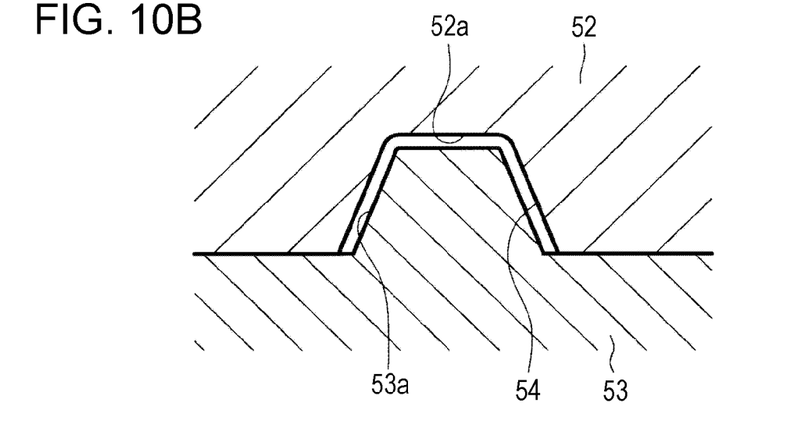
FIG. 10B is a sectional view of FIG. 10A taken along line XB-XB.

A method for manufacturing the license base 4 will now be described with reference to FIGS. 10A and 10B. FIG. 10A is a schematic diagram illustrating a mold used to manufacture the license base. FIG. 10B is a sectional view of FIG. 10A taken along line XB-XB. The arrows in FIG. 10A show directions in which mold plates are removed.

First, a mold 5 used to manufacture the license base 4 will be described. As illustrated in FIG. 10A, the mold 5 includes a first mold plate 51, a second mold plate 52 disposed behind the first mold plate 51, and a third mold plate 53 disposed between lower portions of the first mold plate 51 and the second mold plate 52.

As illustrated in FIG. 10A, the first mold plate 51 has a first cavity surface 51a that is recessed mainly in accordance with the shapes of the front surface 41a and the top, bottom, left, and right surfaces of the main body 41. The first mold plate 51 is moved in the front-rear direction by a driving device of an injection molding machine (not shown).

As illustrated in FIGS. 10A and 10B, the second mold plate 52 has a second cavity surface 52a that is recessed mainly in accordance with the shapes of the rear surface 41b of the main body 41, the front surface of the leg portion 42, and the rear, left, and right surfaces of the hinge portion 43. The second mold plate 52 is moved in the front-rear direction by the driving device of the injection molding machine (not shown)

As illustrated in FIGS. 10A and 10B, the third mold plate 53 has a third cavity surface 53a that is recessed mainly in accordance with the shapes of the rear surface 41b of the main body 41, the back surface of the leg portion 42, and the front surface of the hinge portion 43. The third mold plate 53 is moved in the top-bottom direction by the driving device of the injection molding machine (not shown). As illustrated in FIG. 9A, in the present embodiment, the base portion 43a of the hinge portion 43 is inclined upward and forward, and the reduced thickness portions 43c are formed in the rear surface of the hinge portion 43. Therefore, the third mold plate 53 can be removed downward.

Referring to FIGS. 10A and 10B, a cavity 54 is formed between the first to third cavity surfaces 51a to 53a when the first to third mold plates 51 to 53 are clamped together. At least one of the first to third mold plates 51 to 53 has a gate (not shown) through which a resin material (molten resin) is supplied from the injection molding machine to the cavity 54.

To manufacture the license base 4, first, the first to third mold plates 51 to 53 are clamped together. Accordingly, the cavity 54 is formed between the first to third cavity surfaces 51a to 53a.

Subsequently, the resin material (molten resin) is injected into the cavity 54 from the injection molding machine through the gate.

After the resin material is cured (after the license base 4 is formed), the first to third mold plates 51 to 53 are moved away from each other. After the injection molding process, secondary processing, such as hole forming, is performed. Thus, the license base 4 is manufactured.

Effects of the vehicle V having the front vehicle body structure according to the present embodiment will now be described.

According to the present embodiment, the license base 4 is fixed to the bumper face 1 by clamping the upper wall portion 12 of the bumper face 1 and the upper frame portion 22b of the lower grille 2 between the end portion 43b of the hinge portion 43 and the upper wall portion 42a of the leg portion 42 in the top-bottom direction. Accordingly, it is not necessary to form a recess in the bumper face 1 or attach mounting seats to the bumper face 1 to fix the license base 4 to the bumper face 1. Therefore, the appearance of the vehicle body in the state in which the license plate and the license base 4 are removed can be improved.

According to the present embodiment, it is not necessary to attach mounting seats to the bumper face 1 to fix the license base 4 to the bumper face 1. Therefore, the design of the bumper face 1 is not limited by the mounting seats, and the degree of freedom in design of the bumper face 1 can be increased.

According to the present embodiment, the length L1 of the latch portion 43d in the front-rear direction is greater than the length L2 of the opening 42c1 in the front-rear direction. Therefore, when the hinge portion 43 is bent rearward and upward with the reduced thickness portions 430 serving as the bending points and the engagement portion 43d1 is engaged with the edge of the opening 42c1 at the back end thereof, the end portion 43b of the hinge portion 43 is held at a position behind the leg portion 42 which is separated from the leg portion 42 by a predetermined distance. Accordingly, even when the bumper opening 11 and the upper opening 22e are small, the end portion 43b of the hinge portion 43 and the leg portion 42 can be easily and smoothly placed above and below the upper wall portion 12 of the bumper face 1 and the upper frame portion 22b of the lower grille 2. Therefore, the working efficiency in engaging the end portion 43b of the hinge portion 43 with the upper wall portion 12 of the bumper face 1 can be increased. This has an important technical meaning in view of increasing the working efficiency in attaching the license base 4 since the license base 4 is attached to the bumper face 1 after the bumper face 1 is attached to the vehicle V.

According to the present embodiment, the license base 4 is fixed to the bumper face 1 by inserting the tapping screw 21 through the screw insertion holes 42c2, 43e, and 43f4 from the lower front and tightening the tapping screw 81 such that the upper wall portion 12 of the bumper face 1 and the upper frame portion 22b of the lower grille 2 are clamped between the end portion 43h of the hinge portion 43 and the upper wall portion 42a of the leg portion 42 in the top-bottom direction. Accordingly, not only the working efficiency in engaging the end portion 43h of the hinge portion 43 with the upper wall portion 12 of the bumper face 1 but also the installation accuracy of the license base 4 can be increased. In particular, in the present embodiment, the tapping screw 31 is fastened while the hinge portion 43 is positioned by bringing the side surface 43g of the end portion 43h on the inner side thereof in the vehicle width direction into contact with the side surface 22i of the positioning cut portion 22h on the inner side thereof in the vehicle width direction. Therefore, the installation accuracy of the license base 4 can be increased.

In the present embodiment, the license base 4 can be further securely fixed to the bumper face 1 since the upper wall portion 12 of the bumper face 1 is clamped between the end portion 43b of the hinge portion 43 and the upper wall portion 42a of the leg portion 42 by the fastening force applied by the tapping screw S1. Accordingly, the fastening force with which the license base 4 is fixed to the bumper face 1 can be reduced at other locations (attachment portions 41d). Therefore, at those other locations, the license base 4 can be fixed to the bumper face 1 with a simpler structure.

In the present embodiment, the rear wall portion 42c is inclined upward and forward, and the base portion 43a extends along the imaginary extension line T of the rear wall portion 42c. Therefore, the leg portion 42 and the hinge portion 43 may be formed integrally with each other. Since the rear wall portion 42c of the leg portion 42 is inclined forward, when the tapping screw S1 is inserted through the screw insertion holes 42c2, 43e, and 43f4, the tapping screw S1 can be fastened with a tool that is inserted from the lower front. Accordingly, the working efficiency can be increased compared to the case in which the tool is inserted from the bottom.

Although the embodiment of the present disclosure is described in detail with reference to the drawings, the present disclosure is not limited to the embodiment, and various modifications can be made as appropriate within a scope of the present disclosure.

For example, although the main body 41, the leg portions 42, and the hinge portions 43 are integrally formed in the present embodiment, the present disclosure is not limited to this. For example, the leg portions 42 and the hinge portions 43 may be formed separately from the main body 41, and the front ends of the leg portions 42 may be fixed to the rear surface 41b of the main body 41.

Although each leg portion 42 and the corresponding hinge portion 43 are fastened together by using the tapping screw S1 in the present embodiment, the present disclosure is not limited to this. For example, each leg portion 42 and the corresponding hinge portion 43 may instead fastened together by using other fixing units, such as bolts.

Although each hinge portion 43 is provided with the J-nut 43f and the tapping screw S1 is screwed into the J-nut 43f in the present embodiment, the present disclosure is not limited to this. The J-nut 43f may be omitted and a threaded hole may be formed in the hinge portion 43 so that the tapping screw S1 can be screwed into the threaded hole.

We claim:

1. A front vehicle body structure comprising:
a bumper face extending in a vehicle width direction; and
a license base member fixed to the bumper face, the license base member and the bumper face being separate parts,
wherein the license base includes:
a main body including a front surface to attach a license plate thereon,
a leg portion extending rearward from a rear surface of the main body, and
a hinge portion extending downward from a rear end of the leg portion and is capable of being bent upward, and
wherein the license base member is fixed to the bumper face by bending the hinge portion upward and engaging the bent hinge portion with the bumper face.

2. The front vehicle body structure according to claim 1, wherein the bumper face includes a bumper opening of a through-hole in a front-rear direction of a vehicle body and a wall portion extending rearward from an upper rear edge of the bumper opening, and
wherein the hinge portion is L-shaped in vertical cross section and a rear end of the wall portion is clamped between the bent hinge portion and the leg portion.

3. The front vehicle body structure according to claim 2, wherein the hinge portion includes a reduced thickness portion disposed near the leg portion and serving as a bending point and a latch portion disposed below the reduced thickness portion and projecting rearward,
wherein the leg portion includes a first hole at the rear end thereof to receive the latch portion inserted therethrough and engaged therewith, and
wherein a length of the latch portion in the front-rear direction is greater than a depth of the first hole.

4. The front vehicle body structure according to claim 3, wherein the leg portion further includes a second hole at the rear end thereof,
wherein the hinge portion further includes a fastening portion disposed at a position corresponding to a position of the second hole in the state in which the hinge portion is bent upward, and
wherein, when a fastening member is fastened to the second hole and the fastening portion from the front with the hinge portion being bent upward, the bent hinge portion approaches the leg portion to clamp the rear end of the wall portion with the leg portion.

5. The front vehicle body structure according to claim 1, wherein the rear surface of the leg portion is inclined forward, and the hinge portion extends along an imaginary extension line of the inclined rear surface before the hinge portion is bent.

6. The front vehicle body structure according to claim 1, wherein the bumper face includes a bumper opening of a through-hole in a front-rear direction of a vehicle body and a wall portion extending rearward from an upper rear edge of the bumper opening, and
wherein the bent hinge portion is engaged with the wall portion of the bumper face.

7. The front vehicle body structure according to claim 4, wherein the latch portion engages with the first hole to hold the hinge portion bent such that a free end of the hinge portion is positioned in close proximity to the leg portion.

8. The front vehicle body structure according to claim 3, wherein the fastening portion includes a nut and the fastening member is a screw mating the nut.

* * * * *